United States Patent
Xue et al.

(10) Patent No.: US 7,672,091 B2
(45) Date of Patent: Mar. 2, 2010

(54) RESET DEVICE FOR BIASING ELEMENT IN A MAGNETIC SENSOR

(75) Inventors: Song S. Xue, Edina, MN (US); Paul E. Anderson, Eden Prairie, MN (US); Kaizhong Gao, Eden Prairie, MN (US); Kristin Duxstad, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 1020 days.

(21) Appl. No.: 11/376,014

(22) Filed: Mar. 15, 2006

(65) Prior Publication Data

US 2007/0217084 A1 Sep. 20, 2007

(51) Int. Cl.
 G11B 5/39 (2006.01)
(52) U.S. Cl. ................................. 360/324.12
(58) Field of Classification Search ............. 360/324.12
 See application file for complete search history.

(56) References Cited

U.S. PATENT DOCUMENTS

| | | | |
|---|---|---|---|
| 4,065,757 A | 12/1977 | Kardashian | |
| 4,158,811 A | 6/1979 | Li et al. | |
| 5,229,902 A | 7/1993 | Zucker et al. | |
| 5,798,896 A * | 8/1998 | Araki et al. | 360/324 |
| 5,867,351 A | 2/1999 | Gill | |
| 6,105,237 A | 8/2000 | Gill | |
| 6,157,524 A | 12/2000 | Nakazawa et al. | |
| 6,380,654 B1 | 4/2002 | Dokonal et al. | |
| 6,462,897 B1 | 10/2002 | Yamamoto | |
| 6,728,055 B1 * | 4/2004 | Gill et al. | 360/66 |
| 6,754,048 B2 | 6/2004 | Li et al. | |
| 6,794,063 B2 | 9/2004 | Okada et al. | |
| 6,924,965 B2 | 8/2005 | Babich | |
| 7,370,404 B2 * | 5/2008 | Gill et al. | 29/603.08 |
| 2002/0163766 A1 * | 11/2002 | Eguchi et al. | 360/324.12 |

OTHER PUBLICATIONS

Giora J. Tarnopolsky, et al., 17 Gb/in$^2$ Areal Density Demonstration at 214 Mb/s, IEEE Transactions on Magnetics, vol. 36, No. 1, Jan. 2000, pp. 73-79.

K. Stoev, et al., Demonstration and Characterization of Greater than 60 Gb/in$^2$ Recording Systems, IEEE Transactions on Magnetics, vol. 37, No. 4, Jul. 2000, pp. 1264-1267.

* cited by examiner

*Primary Examiner*—Craig A Renner
*Assistant Examiner*—Tamara Ashford
(74) *Attorney, Agent, or Firm*—Kinney & Lange, P.A.

(57) ABSTRACT

A device resets a biasing magnetization of a biasing element in a magnetic sensor. The device includes a magnetic structure that is magnetically coupled to the biasing element. A conductive element is disposed around at least a portion of the magnetic structure. When a current is passed through the conductive element, a magnetic field is produced that resets the biasing magnetization of the biasing element.

20 Claims, 2 Drawing Sheets us7672091b2

RESET DEVICE FOR BIASING ELEMENT IN A MAGNETIC SENSOR

BACKGROUND OF THE INVENTION

The present invention relates to magnetic data storage and retrieval systems. More particularly, the present invention relates to a device for resetting the biasing magnetization of a biasing element in a magnetic sensor.

In an electronic data storage and retrieval system, a magnetic recording head typically includes a reader portion having a sensor for retrieving magnetically encoded information stored on a magnetic medium. Magnetic flux from the surface of the medium causes rotation of the magnetization vector of a sensing layer or layers of the sensor, which in turn causes a change in the electrical properties of the sensor. The sensing layers are often called free layers, since the magnetization vectors of the sensing layers are free to rotate in response to external magnetic flux. The change in the electrical properties of the sensor may be detected by passing a current through the sensor and measuring a voltage across the sensor. External circuitry then converts the voltage information into an appropriate format and manipulates that information as necessary to recover information encoded on the medium.

The sensor must be stabilized against the formation of edge domains because domain wall motion results in electrical noise that makes data recovery impossible. A common way to achieve stabilization is with a permanent magnet abutted junction design in which permanent magnet bias elements abut opposite sides of the sensor. Permanent magnets have a high coercive field (i.e., are magnetically hard). The magnetostatic field from the permanent magnets stabilizes the sensor, prevents edge domain formation, and provides proper bias.

As the magnetic sensor is exposed to the magnetic field from the magnetic medium, the permanent magnets may experience high frequency agitation from the field. This agitation opposes the intrinsic residual flux of the permanent magnets, which causes randomization of the magnetic domains of the permanent magnets. As a result, the magnetization strength of the permanent magnets may degrade over time, causing destabilization of domain walls and increased electrical noise in the free layer.

BRIEF SUMMARY OF THE INVENTION

The present invention is a device for resetting a biasing magnetization of a biasing element in a magnetic sensor. The device includes a magnetic structure that is magnetically coupled to the biasing element. A conductive element is disposed around at least a portion of the magnetic structure. When a current is passed through the conductive element, a magnetic field is produced that resets the biasing magnetization of the biasing element.

DETAILED DESCRIPTION

Figure 1:
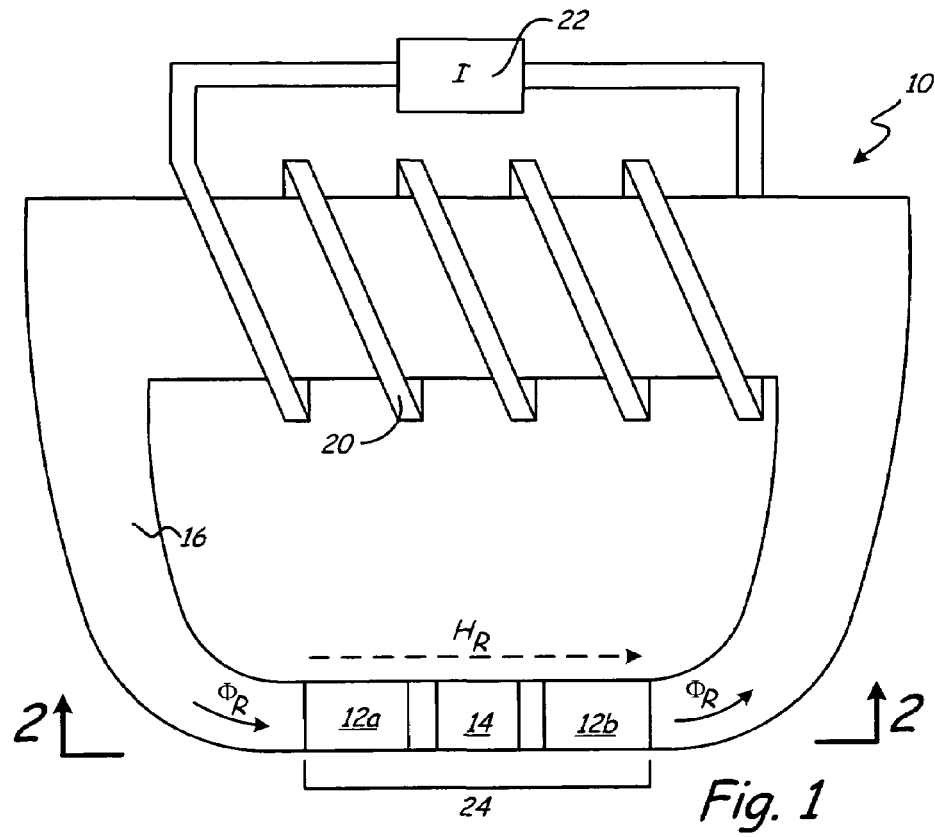
FIG. 1 is a top view of a magnetic circuit for resetting the biasing magnetization of biasing elements for a magnetic sensor.
Figure 2:
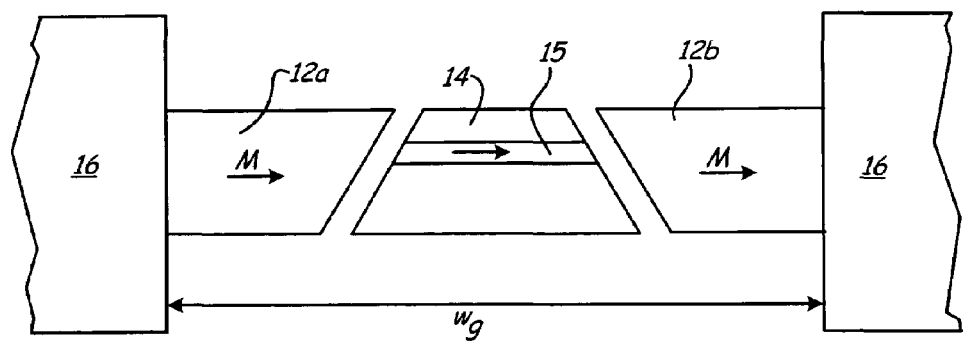
FIG. 2 is a sectional view along lines 2-2 in FIG. 1.

FIG. 1 is a top view and FIG. 2 is a sectional view of a magnetic circuit 10 for resetting the biasing magnetization M of biasing elements 12a and 12b in a magnetic sensor. The magnetic sensor includes sensor stack 14 having sensing portion 15. Sensor stack 14 is positioned between biasing elements 12a and 12b and is separated from biasing elements 12a and 12b by insulating spacers. Magnetic sensor 10 includes magnetic yoke 16, conductive coil 20, and reset current source 22. Magnetic yoke 16 is magnetically coupled to biasing elements 12a and 12b and defines gap region 24 having a width $w_g$. Sensor stack 14 and biasing elements 12a and 12b are disposed in gap region 24. Conductive coil 20 is disposed around a portion of magnetic yoke 16, and is electrically connected to reset current source 22.

Sensor stack 14 is a multilayer device operable to sense magnetic flux from an external source, such as from a magnetic medium. Sensor stack 14 may be configured, for example, as a tunneling magnetoresistive stack or a current-perpendicular-to-plane spin valve sensor stack. Sensor stack 14 includes sensing portion 15, which may be a single layer or multilayer structure. Magnetic flux causes rotation of the magnetization vector of sensing portion 15, which in turn causes a change in the electrical properties of sensor stack 14. The change in the electrical properties of sensor stack 14 may be detected by passing a current through sensor stack 14 and measuring a voltage across the sensor stack 14.

Biasing elements 12a and 12b are positioned on opposite sides of sensor stack 14 to stabilize sensing portion 15 against the formation of edge domains. Biasing elements 12a and 12b have a fixed magnetization direction M. In one embodiment, biasing elements 12a and 12b are permanent magnets comprising a material having a high coercivity (i.e., greater than about 1.0 kOe), such as CoPt, CoCrPt, FePt, NdFeB, and SmCo. The magnetostatic field from biasing elements 12a and 12b stabilizes sensor stack 14 by preventing edge domain formation in sensing layer 15. It should be noted that the fixed magnetization directions M in biasing elements 12a and 12b are merely illustrative, and biasing elements 12a and 12b may have any fixed magnetization directions that appropriately bias sensing layer 15.

Magnetic yoke 16 is magnetically coupled to biasing elements 12a and 12b and defines gap region 24. The ratio of gap width $w_g$ to a width of sensing layer 15 is less than about 100. Magnetic yoke 16 abuts biasing elements 12a and 12b at the edges of gap region 24. The ratio of the cross-section of magnetic yoke 16 to the cross-section of biasing elements 12a and 12b where magnetic yoke 16 abuts biasing elements 12a and 12b may be in the range of about 0.1 to 100. In one embodiment, magnetic yoke 16 is made of a soft magnetic material having a high magnetic moment (i.e., at least about 1.0 T), such as CoFe, NiFe, CoNiFe, CoFeV, CoFeMn, CoFeCr, FeN, FeAlN, and FeTaN.

Conductive coil 20 is disposed around a portion of magnetic yoke 16 and is electrically connected to reset current source 22. Reset current source 22 provides a current through conductive coil 20 such that the magnetomotive force in the coils induces magnetic flux $\Phi_R$ in magnetic yoke 16. The direction of the current provided by reset current source 22 through conductive coil 20 determines the direction of magnetic flux $\Phi_R$ through magnetic yoke 16. Magnetic flux $\Phi_R$ in magnetic yoke 16 induces a magnetic field $H_R$ in the same direction as magnetic flux $\Phi_R$ across gap region 24. The shape of magnetic yoke 16 and the configuration of conductive coil 20 are merely illustrative, and magnetic yoke 16 and conductive coil 20 may have any configuration that causes a desired magnetic flux $\Phi_R$ and magnetic field $H_R$ when a current is passed through conductive coil 20.

In order to reset the biasing magnetization M of biasing elements 12a and 12b, reset current source 22 provides a current through conductive coil 20 to induce magnetic field $H_R$ across gap region 24 (and in particular across biasing elements 12a and 12b) that exceeds the coercivity of biasing elements 12a and 12b. When magnetic field $H_R$ exceeds the coercivity of biasing elements 12a and 12b, the magnetic domains of biasing elements 12a and 12b align in the direction of magnetic field $H_R$. If biasing elements 12a and 12b have a high residual flux density (for example in hard magnetic materials, such as permanent magnets), the magnetic domains remain aligned in the direction of magnetic field $H_R$ after reset current source 22 is deactivated. In one embodiment, reset current source 22 provides a DC current pulse through conductive coil 20. The duration of the pulse provided by reset current source 22 depends on the magnitude of magnetic field $H_R$ produced across gap region 24, but may be in the range of a few milliseconds to a few seconds. In one embodiment, the biasing magnetization M of biasing elements 12a and 12b is reset when sensor stack 12 is not active (i.e., when sensor stack 12 is not operating to sense external magnetic flux).

Magnetic circuit 10 may be configured to either actively or passively reset the magnetization of biasing elements 12a and 12b. To actively reset the magnetization of biasing elements 12a and 12b, reset current source 22 may be configured to provide a current through conductive coil 20 when the magnetizations M of biasing elements 12a and 12b decrease below a threshold strength. The magnetization strength of biasing elements 12a and 12b may be determined either with sensors associated with biasing elements 12a and 12b, or by monitoring the performance of sensor stack 14 for indications of reduced biasing magnetization (i.e., increased noise from sensing portion 15). To passively reset the magnetization of biasing elements 12a and 12b, reset current source 22 may be configured to provide a current through conductive coil 20 periodically (e.g., daily, weekly, monthly, etc.), regardless of the magnetization strength of biasing structures 12a and 12b. The control of magnetic circuit 10 may be implemented in hardware, software, or firmware.

Figure 3:
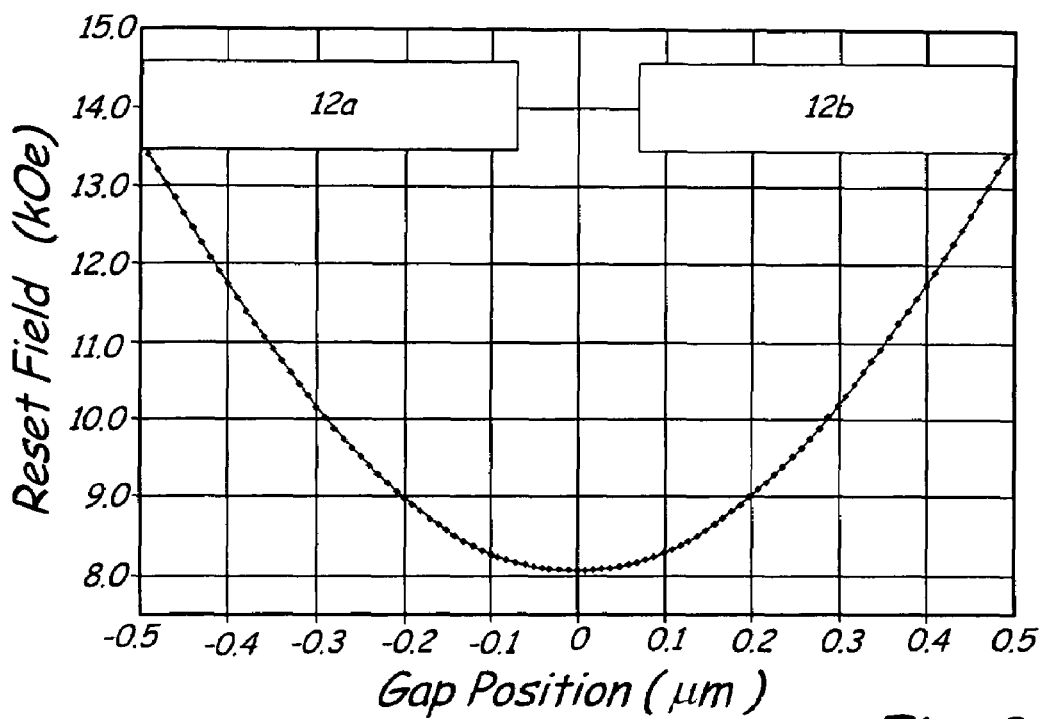
FIG. 3 is a graph of the reset field versus the pole gap position for a magnetic circuit having a gap width of 1.0 μm and cross-section dimensions of 1.0 μm by 1.0 μm.
Figure 4:
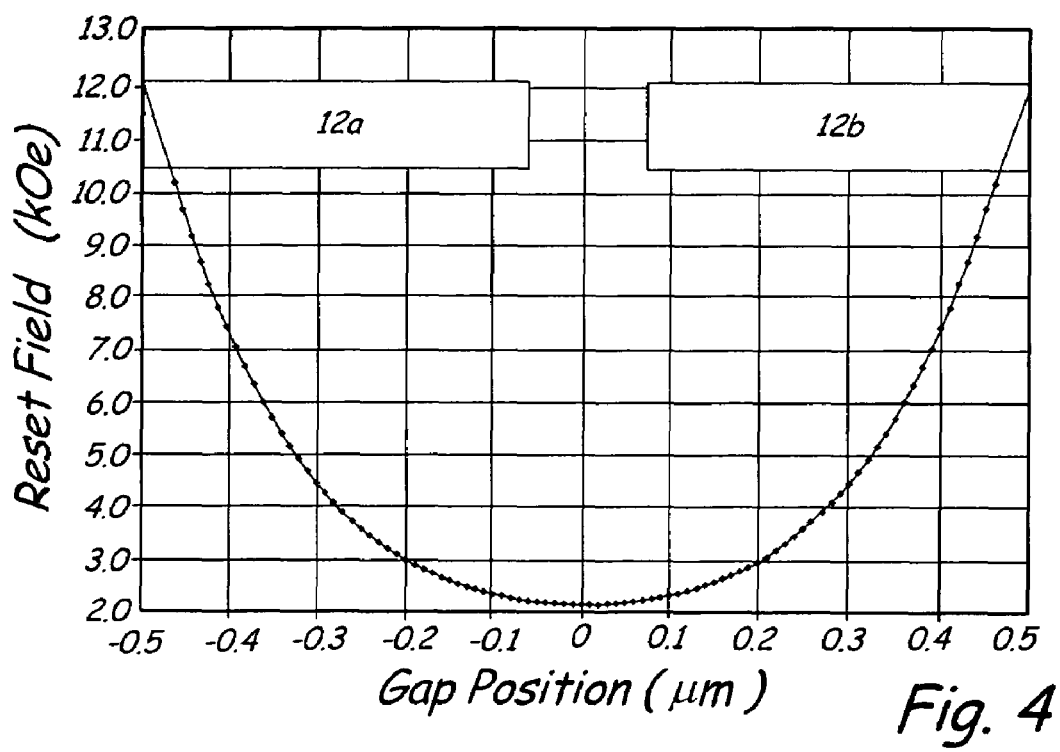
FIG. 4 is a graph of the reset field versus pole gap position for a magnetic circuit having a gap width of 1.0 μm and cross-section dimensions of 0.5 μm by 0.33 μm.

Magnetic field $H_R$ across gap region 24 was simulated for magnetic writers having a gap width of 1.0 μm and magnetic yoke 16 made of a material having a magnetic moment of 2.4 T. FIG. 3 is a graph of the reset field intensity (in kOe) versus the gap position relative to the center of gap region 24 (in μm) for a magnetic yoke 16 having cross-section dimensions of 1.0 μm by 1.0 μm where magnetic yoke 16 abuts biasing elements 12a and 12b. FIG. 4 is a graph of the reset magnetic field intensity (in kOe) versus the gap position relative to the center of gap region 24 (in μm) for a magnetic yoke 16 having cross-section dimensions of 0.5 μm by 0.33 μm where magnetic yoke 16 abuts biasing elements 12a and 12b. Biasing elements 12a and 12b are superimposed on the graphs of FIGS. 3 and 4 to show the magnetic field intensity relative to biasing elements 12a and 12b (and sensor stack 14, which would be located between biasing elements 12a and 12b) in gap region 24.

The magnetic field $H_R$ across gap region 24 varies in intensity relative to the position in gap region 24. In particular, the magnetic field $H_R$ is weakest at the center of gap region 24 (at the center of sensor stack 14) and strongest at the edges of gap region 24. In FIG. 3, magnetic field $H_R$ across biasing elements 12a and 12b is in the range of about 8.2 kOe nearest the center of gap region 24 to about 13.5 kOe at the edges of gap region 24. In FIG. 4, magnetic field $H_R$ across biasing elements 12a and 12b is in the range of about 2.3 kOe nearest the center of gap region 24 to about 12.5 kOe at the edges of gap region 24. These magnetic field intensities are great enough to exceed typical coercivities for biasing elements 12a and 12b, which consequently resets the biasing magnetization of biasing elements 12a and 12b.

In summary, the present invention is a device for resetting a biasing magnetization of a biasing structure in a magnetic sensor. The device includes a magnetic structure that is magnetically coupled to the biasing element. A conductive element is disposed around at least a portion of the magnetic structure. When a current is passed through the conductive element, a magnetic field is produced that resets the biasing magnetization of the biasing element. The device of the present invention allows the magnetization of the biasing element to be reset after the magnetic sensor has been installed in a sensor system (which typically makes the magnetic sensor inaccessible externally). The magnetization of the biasing element may be reset actively, such that the current is passed through the conductive element when the magnetization of the biasing structure falls below a threshold strength. The magnetization of the biasing structure may also be reset passively, such that the current is passed through the conductive element periodically, regardless of the magnetization strength of the biasing structure.

Although the present invention has been described with reference to preferred embodiments, workers skilled in the art will recognize that changes may be made in form and detail without departing from the spirit and scope of the invention.

The invention claimed is:

1. A device comprising:
  a magnetic sensor that includes a biasing structure for applying a bias field to prevent edge domain formation;
  a magnetic structure adjacent to and magnetically coupled to the biasing structure; and
  a conductive element disposed around at least a portion of the magnetic structure, wherein a current is passed through the conductive element to produce a magnetic field that resets the biasing magnetization of the biasing structure;
  wherein the magnetic structure and conductive element form integral parts of the magnetic sensor.

2. The device of claim 1, wherein the magnetic structure comprises a material having a magnetic moment of at least 1.0 T.

3. The device of claim 1, wherein the magnetic structure comprises a material selected from the group consisting of CoFe, NiFe, CoNiFe, CoFeV, CoFeMn, CoFeCr, FeN, FeAlN, and FeTaN.

4. The device of claim 1, wherein the biasing structure comprises a permanent magnet.

5. The device of claim 1, wherein the conductive element comprises a conductive coil.

6. A magnetic sensor comprising:
  a sensor stack including a sensing element;
  a biasing structure having a magnetization vector and positioned relative to the sensor stack to bias the sensing element; and
  a magnetic circuit positioned adjacent to the biasing structure and integral with the biasing structure and the sensor stack for producing a reset magnetic field that resets a magnetization of the biasing structure in a direction of the magnetization vector.

7. The magnetic sensor of claim 6, wherein the magnetic circuit comprises:
  a magnetic structure magnetically coupled to the biasing structure; and a conductive element disposed around at least a portion of the magnetic structure, wherein a current is passed through the conductive element to produce the reset magnetic field.

8. The magnetic sensor of claim 7, wherein the magnetic structure comprises a material having a magnetic moment of at least 1.0 T.

9. The magnetic sensor of claim 7, wherein the magnetic structure comprises a material selected from the group consisting of CoFe, NiFe, CoNiFe, CoFeV, CoFeMn, CoFeCr, FeN, FeAlN, and FeTaN.

10. The magnetic sensor of claim 6, wherein the biasing structure comprises a permanent magnet.

11. The magnetic sensor of claim 10, wherein the permanent magnet is made of a material having a coercivity of at least 1.0 kOe.

12. The magnetic sensor of claim 10, wherein the permanent magnet is made of a material selected from the group consisting of CoPt, CoCrPt, FePt, NdFeB, and SmCo.

13. A magnetic sensor comprising:
  a gap region including a sensing portion and a biasing structure, the biasing structure having a magnetization direction and positioned relative to the sensing portion for biasing the sensing portion;
  a magnetic structure that defines the gap region and is integral with the biasing structure and the sensing portion and magnetically coupled to the biasing structure;
  a conductive element disposed around at least a portion of the magnetic structure; and
  a current source for providing a current through the conductive element that induces a magnetic field in the gap region that exceeds the coercivity of the biasing structure to reset the biasing magnetization of the biasing structure.

14. The magnetic sensor of claim 13, wherein the magnetic structure comprises a material having a magnetic moment of at least 1.0 T.

15. The magnetic sensor of claim 13, wherein the magnetic structure comprises a material selected from the group consisting of CoFe, NiFe, CoNiFe, CoFeV, CoFeMn, CoFeCr, FeN, FeAlN, and FeTaN.

16. The magnetic sensor of claim 13, wherein the biasing structure comprises a permanent magnet.

17. The magnetic sensor of claim 16, wherein the coercivity of the permanent magnet is at least 1.0 kOe.

18. The magnetic sensor of claim 16, wherein the permanent magnet is made of a material selected from the group consisting of CoPt, CoCrPt, FePt, NdFeB, and SmCo.

19. The magnetic sensor of claim 13, wherein a ratio of a magnetic structure cross-section to a biasing element cross-section where the magnetic structure is magnetically coupled to the biasing element is in a range of about 0.1 to about 100.

20. The magnetic sensor of claim 13, wherein the current source provides a DC current pulse through the conductive element.

* * * * *